Patented Apr. 14, 1936

2,037,419

UNITED STATES PATENT OFFICE 2,037,419

MANUFACTURE OF HALOGENATED HYDROCARBONS

Arthur Andrew Levine and Harlan A. Bond, Niagara Falls, N. Y., assignors to E. I. du Pont de Nemours & Company, Inc., Wilmington, Del., a corporation of Delaware No Drawing. Application June 20, 1933, Serial No. 676,761

19 Claims. (Cl. 260—162)

This invention relates to the manufacture of solid halogenated hydrocarbons, and more particularly to the manufacture of hexachlorethane.

Hexachlorethane has been prepared heretofore by the chlorination of tetrachlorethane in the presence of catalysts and by the chlorination of perchlorethylene in the presence of light. In such processes the lower chlorine derivative of ethane or ethylene ordinarily is partially chlorinated to such extent that hexachlorethane crystallizes out when the reaction mixture is cooled. The crystallized hexachlorethane is then removed from the supernatant liquor by filtration or centrifuging, and the collected crystals are set out to dry in the air in order to remove the mother liquor adhering thereto. A disadvantage in this method of recovering the product is that the hexachlorethane, being of a highly volatile nature, is vaporized in substantial amounts even at room temperature. Hence, during the processes of crystallizing, filtering and drying a considerable portion of the hexachlorethane is lost, together with substantial amounts of the lower chlorinated hydrocarbons.

An object of this invention is to provide improved methods for the manufacture of hexachlorethane and more particularly for the separation of pure hexachlorethane from reaction mixtures.

We have discovered that hexachlorethane may be produced in good yields from perchlorethylene, even in the absence of light, by the use of certain suitable catalysts, namely, iodine, aluminum chloride, ferric chloride, or antimony chloride. We have further discovered that hexachlorethane may be separated with substantially no loss from the reaction mixture by a vacuum distillation at a suitably low temperature.

In one method of carrying out our invention chlorine is passed into liquid perchlorethylene at a temperature of 80 to 100° C. The chlorination is continued until at least sufficient hexachlorethane has been formed to crystallize out when the reaction mixture is cooled. We prefer to continue chlorination until a heavy sludge of hexachlorethane is produced on cooling. The chlorination should not be allowed to continue much further than this point; otherwise the entire mass tends to solidify on cooling and removal from the reaction chamber is difficult. The reaction mixture, either with or without cooling, is passed through a pipe line directly into a vacuum still which is equipped with an agitator. Here the mixture is distilled under vacuum at a temperature not exceeding about 120° C. and preferably between 60 and 100° C. During the distillation, the mixture in the still preferably is continuously agitated at a rate sufficient to prevent caging of the material. The distillate, which consists mainly of perchlorethylene containing small amounts of hexachlorethane, is condensed and returned to the chlorination reactor or is stored to await subsequent chlorination. The residue remaining after the distillation consists of hexachlorethane which is substantially pure except that it may contain small amounts of insoluble material if a non-volatile catalyst was used in the chlorination step. For example, we have found that if iodine is used as a catalyst in the chlorination step, substantially all of the catalyst will be distilled over with the perchlorethylene, and the residual hexachlorethane is substantially free from both catalyst and other chlorinated hydrocarbons. However, if a relatively non-volatile catalyst such as aluminum chloride has been used, the residual hexachlorethane will be contaminated with the non-volatile catalyst. However, in this case, the product may be substantially completely purified by sublimation. A preferred method comprises subliming the hexachlorethane from the same still in which the separation of perchlorethylene occurred.

The degree of separation of the lower chlorinated hydrocarbons from hexachlorethane attained by our process depends upon the temperature used during the vacuum distillation. In order to obtain hexachlorethane of a high degree of purity the distillation should not be carried out at a temperature above 120° C. We prefer to carry out the vacuum distillation at a temperature of 60 to 100° C. as we have found that in general the degree of separation varies inversely with the distillation temperature. Hence, at the lower temperatures the ratio of lower chlorinated hydrocarbons to hexachlorethane in the distillate is increased. Furthermore, in order to obtain substantially complete separation, the nature of the lower chlorinated hydrocarbons which are to be removed from the hexachlorethane must be taken into account. For example, if it is desired to remove tetrachlorethane or pentachlorethane from the hexachlorethane, the distillation temperature preferably is maintained below about 80° C., while trichlorethylene or perchlorethylene may be substantially completely separated by distilling at temperatures as high as 120° C. If desired, temperatures below 60° C. may be used; however, at such lower temperatures the time required for complete separation is considerably lengthened.

Efficient agitation of the mixture during vacuum distillation is an important feature of our process. Although agitation is not absolutely essential, it results in better separation and decreases the time required to complete the separation. The purpose of the agitation is to maintain a substantially uniform temperature throughout the mass of material in the still and to break up aggregations or lumps of crystals which may contain occluded solvent. In general, the employment of agitation increases the rate of heat transfer without the use of high temperature gradients and hence avoids excessive sublimation of the hexachlorethane at points adjacent to the heated surfaces. If agitation is used, we prefer to agitate the mixture substantially continuously during distillation; otherwise, the mixture tends to cake, making subsequent agitation difficult or impossible. The various well-known means for agitating solid materials are applicable to our process.

The temperature of distillation obviously is controlled by the degree of vacuum applied to the still. In general the still pressures used in our process will vary between 30 and 75 mm. of mercury.

The following examples illustrate specific methods of carrying out our invention.

Example I

Chlorine was passed through 58.1 kilograms of perchlorethylene containing about 0.6% by weight of aluminum chloride, while the temperature of the liquid was maintained at 60 to 100° C. by cooling the reaction vessel. After chlorinating for 8 hours, the liquid was filtered at the reaction temperature and cooled to about 20° C., whereupon hexachlorethane crystallized out. The hexachlorethane crystals were removed by filtration and the mother-liquor was chlorinated at 60 to 100° C. in the presence of about 0.6% by weight of aluminum chloride for three hours. After the second chlorination, hexachlorethane was recovered as before. The total weight of recovered hexachlorethane obtained from the two chlorinations corresponded to 94% by weight of the chlorine absorbed and 65.5% of the perchlorethylene. The remaining mother-liquor consisted of unreacted perchlorethylene with hexachlorethane dissolved therein.

Example II

A mixture consisting of 195 pounds of hexachlorethane and 277 pounds of perchlorethylene, which had the consistency of a heavy sludge at room temperature, was placed in a 50-gallon steam-jacketed vacuum kettle, equipped with an efficient stirring mechanism. The charge occupied a space of about 30 gallons. The mixture was then distilled with constant agitation at a pressure of about 10 cm. of mercury for 3 hours and 50 minutes, during which time the temperature of the vapors leaving the still rose from 50° C. to 70° C. The distillate was condensed by passing the vapors into a water-cooled tubular condenser. At the end of the aforesaid distillation period there were substantially no vapors coming from the kettle.

The residue remaining in the kettle was white, free-flowing, solid hexachlorethane of high purity, which melted at 182° C. The residue recovered weighed 160 pounds, equivalent to 82% of the hexachlorethane in the original mixture; the remainder of the hexachlorethane had distilled over with the perchlorethylene. An examination of the connections between the kettle and the vacuum pump, including the condenser, showed that substantially no solid hexachlorethane had deposited therein.

Example III

A heterogenous mixture consisting of 750 grams of hexachlorethane and 428 grams of tetrachlorethane was placed in the still of a vacuum distillation apparatus which was equipped with an agitating device. The material was distilled at a pressure of about 60 mm. of mercury, the temperature in the still-head varying during the distillation from 75 to 91° C. At the end of the distillation, the residue in the still weighed 600 grams and had a melting point of 181° C., corresponding to hexachlorethane of 95–98% purity.

We claim:

1. A process for the production of hexachlorethane comprising reacting chlorine with perchlorethylene in the substantial absence of light and in the presence of a chlorination catalyst.

2. A process for the production of hexachlorethane comprising reacting chlorine with perchlorethylene in the liquid phase in the substantial absence of light and in the presence of a chlorination catalyst at a temperature below about 100° C.

3. A process for the production of hexachlorethane comprising reacting chlorine with perchlorethylene in the liquid phase in the substantial absence of light and in the presence of a catalyst selected from the group which consists of iodine, aluminum chloride, antimony chloride and ferric chloride, at a temperature below about 100° C.

4. A process for the production of hexachlorethane comprising reacting chlorine with perchlorethylene in the liquid phase in the substantial absence of light and in the presence of aluminum chloride at a temperature of 80 to 100° C.

5. A process for the production of hexachlorethane comprising reacting chlorine with perchlorethylene in the liquid phase in the substantial absence of light and in the presence of antimony chloride at a temperature of 80 to 100° C.

6. A process for the production of hexachlorethane comprising reacting chlorine with perchlorethylene in the liquid phase in the substantial absence of light and in the presence of iodine at a temperature of 80 to 100° C.

7. A process for the production of hexachlorethane comprising reacting chlorine with perchlorethylene in the substantial absence of light and in the presence of a chlorination catalyst to form a mixture of perchlorethylene and hexachlorethane, and vacuum distilling said mixture at a temperature below 120° C. to remove perchlorethylene from said mixture.

8. A process for the production of hexachlorethane comprising reacting chlorine with perchlorethylene in the liquid phase in the substantial absence of light and in the presence of a catalyst selected from the group which consists of iodine, aluminum chloride, antimony chloride and ferric chloride at a temperature below about 100° C. to form a mixture of perchlorethylene and hexachlorethane, and vacuum distilling said mixture at a temperature below 120° C to remove perchlorethylene from said mixture.

9. A process for the production of hexachlorethane comprising reacting chlorine with perchlorethylene in the liquid phase in the substantial absence of light and in the presence of a catalyst selected from the group which consists of iodine, aluminum chloride, antimony chloride and ferric chloride at a temperature of 80 to 100° C. to form a mixture of perchlorethylene and hexachlorethane, and simultaneously agitating and vacuum distilling said mixture at a temperature of 60–100° C. to remove perchlorethylene from said mixture.

10. A process for the production of hexachlorethane comprising reacting chlorine with perchlorethylene in the liquid phase in the substantial absence of light and in the presence of aluminum chloride at a temperature of 80 to 100° C. to form a mixture of perchlorethylene and hexachlorethane and simultaneously agitating and vacuum distilling said mixture at a temperature of 60–100° C. to remove perchlorethylene from said mixture.

11. A process for the production of hexachlorethane comprising reacting chlorine with perchlorethylene in the liquid phase in the substantial absence of light and in the presence of antimony chloride at a temperature of 80 to 100° C. to form a mixture of perchlorethylene and hexachlorethane, and simultaneously agitating and vacuum distilling said mixture at a temperature of 60–100° C. to remove perchlorethylene from said mixture.

12. A process for the production of hexachlorethane comprising reacting chlorine with perchlorethylene in the liquid phase in the substantial absence of light and in the presence of iodine at a temperature of 80 to 100° C. to form a mixture of perchlorethylene and hexachlorethane, and simultaneously agitating and vacuum distilling said mixture at a temperature of 60–100° C. to remove perchlorethylene and iodine from said mixture.

13. A process for separating hexachlorethane from a mixture containing hexachlorethane and lower chlorinated derivatives of ethane comprising vacuum distilling said mixture.

14. A process for separating hexachlorethane from a mixture containing hexachlorethane and lower chlorinated derivatives of ethane comprising vacuum distilling said mixture at a temperature below 120° C.

15. A process for separating hexachlorethane from a mixture containing hexachlorethane and lower chlorinated derivatives of ethane comprising simultaneously agitating and vacuum distilling said mixture at a temperature below 120° C.

16. A process for separating hexachlorethane from a mixture containing hexachlorethane and lower chlorinated derivatives of ethane comprising simultaneously agitating and vacuum distilling said mixture at a temperature of 60 to 100° C.

17. A process for separating hexachlorethane from a mixture containing hexachlorethane and perchlorethylene comprising vacuum distilling said mixture at a temperature below 120° C.

18. A process for separating hexachlorethane from a mixture containing hexachlorethane and perchlorethylene comprising simultaneously agitating and vacuum distilling said mixture at a temperature below 120° C.

19. A process for separating hexachlorethane from a mixture containing hexachlorethane and perchlorethylene comprising simultaneously agitating and vacuum distilling said mixture at a temperature of 60 to 100° C.

ARTHUR ANDREW LEVINE.
HARLAN A. BOND.